J. L. WHEELER.
SPINDLE FOR MILLING MACHINES.
APPLICATION FILED OCT. 22, 1914.
1,239,855.
Patented Sept. 11, 1917.
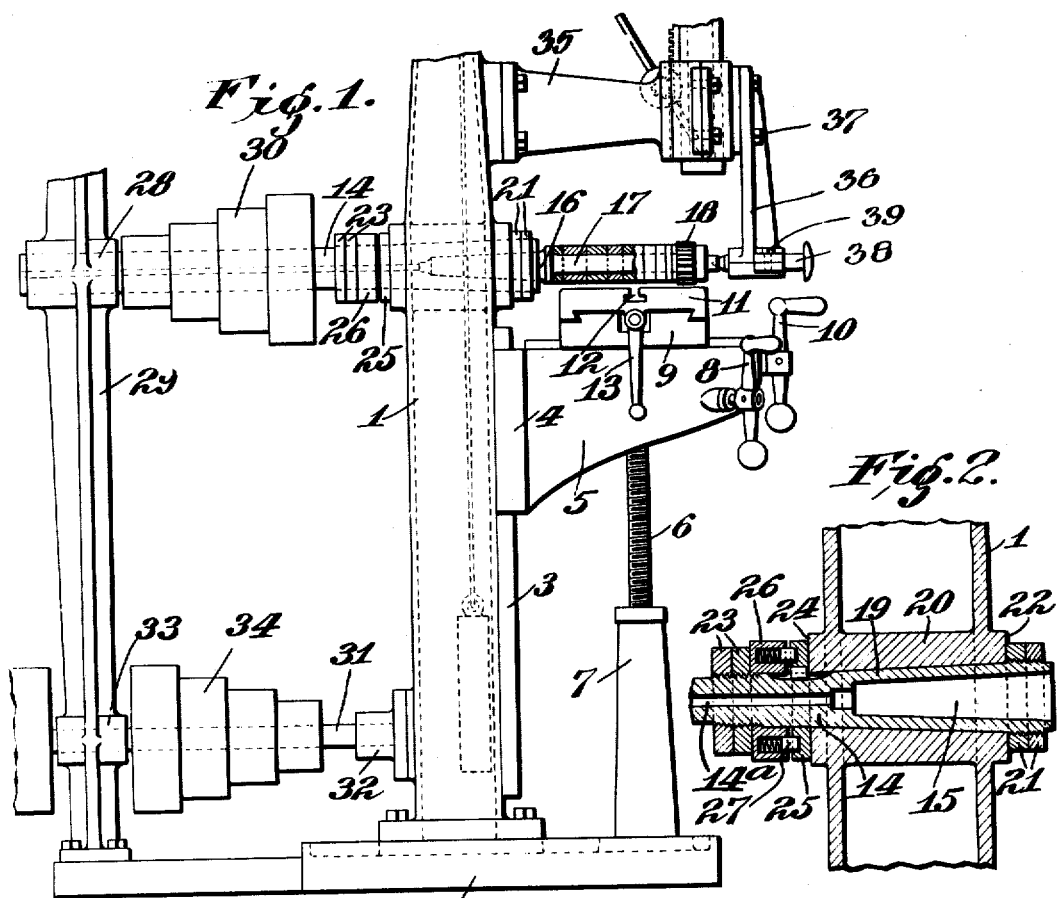
Witnesses:
Stella Hill.
J H Nollelmann
Inventor:
John L. Wheeler,
By George A. Pennington
his Atty.

UNITED STATES PATENT OFFICE.

JOHN L. WHEELER, OF ST. LOUIS, MISSOURI.

SPINDLE FOR MILLING-MACHINES.

1,239,855.

Specification of Letters Patent. Patented Sept. 11, 1917.

Application filed October 22, 1914. Serial No. 867,939.

*To all whom it may concern:*

Be it known that I, JOHN L. WHEELER, a citizen of the United States, residing in the city of St. Louis and State of Missouri, have invented new and useful Improvements in Spindles for Milling-Machines, of which the following is a specification.

This invention relates to milling machines and the like, and has more particularly to do with the spindle construction. It has for its objects to produce a simple and efficient construction and arrangement whereby accuracy and precision in the work may be accomplished, and which will obviate the disadvantages incidental to devices of this character due to the necessarily fine adjustment and consequent heating of the spindle in use.

The invention consists in the parts and in the arrangements and combinations of parts hereinafter described and claimed.

In the accompanying drawing,—

Figure 1 is a side elevation of a machine constructed according to the invention; and Fig. 2 is a detail view of a portion of the spindle.

The machine illustrated in the drawing comprises a hollow column or standard 1 which extends up from a base 2. On the lower front portion of the column is a guide plate 3 whose opposite side marginal portions extend beyond the sides of the column and are beveled to correspond to the sides of a dovetail groove (not shown) in the rear portion 4 of a vertically-adjustable table-bracket 5. This table-bracket is supported, raised and lowered in the usual manner by a screw 6, which is swiveled or otherwise suitably engaged at its upper end to the table-bracket and works through a screw-threaded opening in the top of a hollow pedestal 7 extending up from the base 2; the screw being rotated by suitable gearing (not shown) which is controlled by a handle 8 at the side of the table-bracket.

Mounted slidably on the table-bracket 5 so as to be moved horizontally toward and away from the column 1 is a table-carriage 9 which is actuated in the usual manner by suitable gearing (not shown) and is controlled by a manipulating handle 10 at the front of the table-bracket. The work-table proper 11 is mounted slidably on the table-carriage 9 so as to travel horizontally at right angles to the direction of travel of the latter; said work-table being provided with the usual undercut groove or grooves 12 in its top face in which the work-holding devices are secured, and being actuated by suitable gearing (not shown) and controlled by a manipulating handle 13 at either end.

Extending horizontally through the column 1 is a spindle 14 having the usual tapered socket 15 for the shank 16 of an arbor or mandrel 17 on which the milling cutters 18 are fastened in the usual manner. The spindle is provided with a small axial bore 14ª through which a rod may be inserted to force the arbor when it is desired to remove it from the socket. As shown more clearly in Fig. 2, the journal portion 19 of the spindle is tapered to correspond to the taper of the bore of the bearing portion 20 of the column 1. On the socket end of the spindle are two jam nuts 21 which constitute an adjustable thrust collar adapted to work against a bearing face 22 on the front side of the column 1, while two nuts 23 are provided on the spindle near the opposite side of the column for taking the end thrust of the spindle in the opposite direction. Feather-keyed on the spindle, next to a bearing face 24 on the rear side of the column 1, is a ring 25; and interposed between said ring and the jam nuts 23 is another ring 26 which is provided with spring-pressed pins 27 arranged and adapted to enter recesses provided therefor in the adjacent face of said first mentioned ring 25.

In adjusting the spindle to the bearing 20 the thrust collar 21 is positioned on the spindle so as to just come snugly against the end bearing face 22 when the tapered journal portion 19 of the spindle is fitted to the bore of the bearing 20. The collar 23 is then adjusted to a position on the spindle so that there is slight end play between the rings 25 and 26 which are interposed between said collar 23 and the end bearing face 24 of the column 1.

The interposition of the ring 26 with its spring-pressed pins 27 between the ring 25 and the thrust collar 23 affords a resilient force to constantly hold the spindle with its tapered journal portion well into its bearing and the thrust collar 21 snugly against the bearing face 22, the springs being of sufficient strength to prevent endwise reciprocation of the spindle which might occur owing to end play between the thrust collars either in the adjustment or resulting from expansion of the spindle due to the heating thereof. Said springs also overcome the end pull of the milling cutters on the spindle, yet they yield to the contraction of the spindle due to atmospheric changes or cooling of the spindle when running at slower speeds and thereby prevent binding and sticking of the spindle between the thrust collars. Obviously, therefore, the spindle rotates in its bearing without chattering or end motion, thereby insuring accuracy and precision in the operation of milling.

The spindle 14 is journaled at its end opposite to the socket end in a bearing 28 provided therefor in a pedestal frame or post 29, and on the spindle is a stepped pulley 30, while near the base of the machine is a driving shaft 31 which is journaled at one end in a bracket bearing 32 projecting from the rear side of the column 1 and at its opposite end in a bearing 33 provided therefor on the post 29. The driving shaft is also provided with a stepped pulley 34, in reverse relation to the pulley 30 on the spindle 14, so that different speeds may be imparted to the spindle at will. A support for the outer end of the arbor 17 is obtained by providing a horizontal arm 35 at the front of the column 1 and detachably mounting a depending bracket member 36 at the outer end thereof, as by bolts 37 or other suitable means, and providing said bracket member with a centering pin 38 arranged and adapted to enter an axial recess in the end of the arbor. To afford a lock for the centering pin the bearing through which it works is split and a clamping screw 39 is provided to tighten the bearing about the pin after adjustment is effected.

I claim:

1. In a milling machine or the like, a taper-bored bearing having end thrust shoulders at opposite ends thereof, a spindle having a counterpart tapered portion journaled in said bearing, an adjustable shoulder on said spindle adjacent to the larger end of its journal portion and coöperating with the end thrust shoulder at the corresponding end of the bearing for taking the thrust and limiting the endwise movement of the spindle in one direction, an adjustable shoulder on said spindle adjacent to the smaller end of its journal portion and coöperating with the end thrust shoulder at the corresponding end of the bearing, and a spring-pressed device interposed between said two last-mentioned shoulders, whereby the spindle is yieldably held with its first-mentioned shoulder against the end thrust shoulder at the adjacent end of the bearing.

2. In a milling machine or the like, a taper-bored bearing, a spindle having a counterpart tapered journal portion fitted to said bearing, an end thrust shoulder on said bearing at the smaller end of the bore thereof, a thrust shoulder on said spindle opposed to said first mentioned shoulder, and resilient means interposed between and acting against said two thrust shoulders.

3. In a milling machine or the like, a bearing, a spindle journaled in said bearing, a collar on said spindle abutting the end of said bearing for taking the end thrust and limiting the endwise movement of the spindle in one direction, a ring mounted on said spindle so as to rotate therewith but having free movement endwise thereon, said ring normally abutting the opposite end of the bearing, a thrust collar on said spindle adjacent to said ring, and resilient means on said spindle interposed between and acting against said last-mentioned thrust collar and said ring so as to hold the latter against the end of the bearing and the spindle yieldably with its first-mentioned thrust collar against the opposite end of the bearing.

4. In a milling machine or the like, a bearing, said bearing having thrust faces at its opposite ends, a spindle journaled in said bearing, a thrust collar on said spindle adapted to coöperate with the end of the bearing to limit the endwise movement of the spindle in one direction, a ring mounted on said spindle adjacent to the opposite end of said bearing, said ring having recesses in its outer face and being engaged to said spindle so as to rotate therewith, but being permitted to move separately endwise thereon, a thrust collar on said spindle adjacent to said ring, a second ring interposed between said first mentioned ring and said adjacent thrust collar, said second mentioned ring having spring-pressed pins projecting from its inner face and adapted to engage in the respective recesses in said first mentioned ring, whereby the two rings are held from separate rotation and the spindle is pressed in the direction limited by said first mentioned thrust collar.

5. In a milling machine or the like, a taper-bored bearing having thrust faces at its opposite ends, a spindle having a tapered journal portion in said bearing, an adjustable thrust collar on said spindle adjacent to the larger end of the tapered journal portion thereof and in opposed relation to the thrust face at the corresponding end of said bearing, a collar on said spindle adjacent to the smaller end of the tapered journal portion thereof, said second-mentioned collar being capable of endwise movement on said spindle but fixed to rotate therewith and being in opposite relation to the thrust face at the corresponding end of said bearing, said collar having recesses in its outer face, an adjustable thrust collar on said spindle beyond said second-mentioned collar, and another collar mounted loosely on said spindle between said last-mentioned thrust collar and said second-mentioned collar, said loose collar bearing with its outer face against said last-mentioned thrust collar and having spring-pressed pins projecting from its inner face and bearing in the recesses of said second-mentioned collar.

In testimony whereof, I have hereunto set my hand in presence of two subscribing witnesses.

JOHN L. WHEELER.

Witnesses:
G. A. PENNINGTON,
STELLA HILL.